March 12, 1940.  J. E. ERICKSON  2,193,065
DAMMING ATTACHMENT FOR CULTIVATORS
Filed Jan. 23, 1939
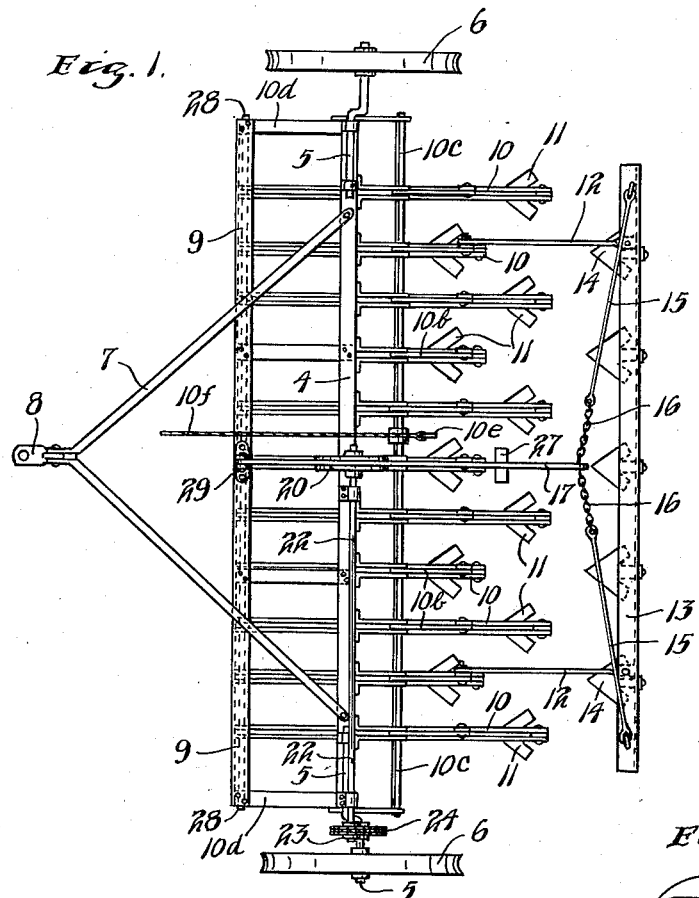
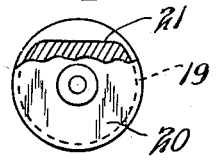
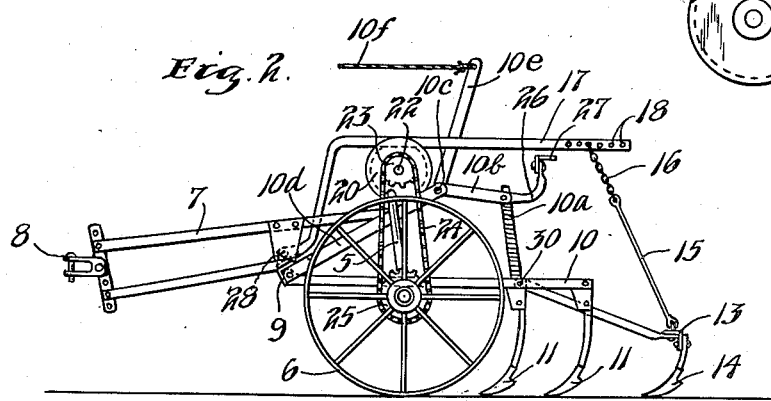
INVENTOR.
JOHN E. ERICKSON.
BY HIS ATTORNEYS.
Williamson & Williamson Patented Mar. 12, 1940

2,193,065

UNITED STATES PATENT OFFICE 2,193,065

DAMMING ATTACHMENT FOR CULTIVATORS

John E. Erickson, East Grand Forks, Minn.

Application January 23, 1939, Serial No. 252,276

5 Claims. (Cl. 97—55)

This invention relates to apparatus for conserving moisture in fields and preventing erosion by wind and water.

Recently there has been developed a practice of moisture and soil conservation in connection with the cultivation of fields which comprises generally the formation of furrows and the damming of said furrows to prevent the running off of moisture.

It is an object of my invention to provide an automatic damming attachment for use particularly with field cultivators and tillers, which is simply constructed and more cheaply manufactured than most other types of automatic equipment in use.

Another object of the invention is to provide a damming apparatus which can be easily incorporated with the conventional type of field cultivator during its manufacture or afterwards as an attachment thereto.

These and other objects and advantages will be more apparent from the following description made in connection with the accompanying drawing, wherein like reference characters refer to the same parts throughout the several views, and in which:

Fig. 1 is a plan view of a field cultivator with my invention incorporated therewith;

Fig. 2 is a side elevation thereof; and

Fig. 3 is a detail of the operating cam with a portion thereof broken away.

In Figs. 1 and 2 the field cultivator is shown having a main cross bar 4 upon the ends of which are mounted stub axles 5 which are supported on wheels 6. It will be noted that the medial portions of the stub axles are bent to provide crank-like elements, and in the usual cultivator means is provided for raising and lowering the frame with respect to the wheels by means of the crank shaped axles. A V-shaped draw bar 7 extends forwardly of the frame, and said draw bar is provided with a draft hitch 8. A cross member 9 extends across the apparatus in front of the first mentioned cross member 4, and pivotally secured to the forward member 9 is a plurality of bars 10, each of which has secured thereto a shovel 11. The bars 10 are connected by springs 10a to arms 10b which are secured to a square cross member 10c, which is supported by diagonal arms 10d, which extend upwardly and rearwardly from the cross member 9. It will be noted that the shovels are disposed in two transverse rows, and that the shovels in one row are staggered with respect to those in the other row. The forward shovels are adapted to make furrows and the rear row of shovels forms other furrows and provides hills in place of the furrows made by the shovels in the front row. A lever 10e extends upwardly from the squared cross member 10c and a rope or cable 10f leads forwardly to the tractor to which the cultivator is hitched. When the rope is pulled forward, the arms 10d will be pulled up and the springs 10a will raise the arms 10 and the cultivator shovels 11. The springs are provided to yieldably support these shovels.

A pair of bars 12 are secured to and extend rearwardly from the ends of two of the rearwardly extending elements 10, as best shown in Fig. 1, and the bars 12 are connected to a transverse angle iron 13, the lower carrying a plurality of relatively broad shovels 14. It will be noted in Fig. 1 that the shovels 14 are disposed directly behind the cultivator shovels 11 in the front row of the normal cultivator gang and that the shovels 14 lie on lines between the paths of movement of the shovels in the rear row of the usual field cultivator elements. A pair of rods 15 are secured at their lower ends to opposite ends of the transverse angle iron 13, and they connect by means of a chain 16 to the rear end of a damming shovel operating lever 17. Said lever is provided with a plurality of holes 18 to permit adjustment of the height of the damming shovels 14. An intermediate portion of the lever 17 rests in the track 19 of a cam 20. It will be noted from Fig. 3 that the face of the cam upon which the lever 17 rests is flattened as at 21 to impart a vertical reciprocating movement to said lever 17. The cam 20 is mounted upon a shaft 22 which extends to one side of the machine and carries a sprocket 23 on its end. The sprocket 23 is driven by a chain 24 which in turn is driven by a sprocket 25 on one of the wheels 6. Consequently, rotation of the drive wheel and the cam 20 produces oscillation of the lever 17 vertically and a similar movement of the damming shovel assembly which comprises the transverse angle iron 13 and the damming shovels 14.

With raising of the main cultivator assembly relative to the wheels, I provide a lever 26 which carries a shoe 27, the latter being positioned beneath the cam operated lever 17. When the shoe engages the under side of the lever and raises the same, said lever will pivot at its point of connection 28 where it is secured to a lug 29 at the center of the forward transverse frame element 9. Furthermore, the damming shovel assembly can be raised due to the pivotal connection 30 between the rearwardly extending bars 12 and their cooperating cultivator shovel supports 10.

When the device is moved across a field, the first two rows of shovels 11 which are the usual field cultivator elements, create ridges and furrows, and the damming shovels 14, when lowered by action of the cam 20, dig into the ridges between the furrows splitting the ridges and causing the earth of the ridges to fall in and dam spaced portions of the furrows. In other types of camming machinery the damming shovels run in the furrows and must pile up a considerable quantity of dirt ahead of them to efficiently close off the furrows. With my arrangement, however, the damming shovels operate on the ridges between the furrows and split the earth in the ridges laterally in two directions to make an efficient dam without digging deeply into the soil. This requires a great deal less power than some other types of damming attachments such as those which are used with listers and which penetrate into the sub-soil.

It will, of course, be understood that various changes may be made in the form, details, arrangement and proportions of the various parts without departing from the scope of my invention.

What is claimed is:

1. In a cultivator and the like, a plurality of transverse rows of cultivating elements staggered with respect to the elements in other rows, a plurality of damming shovels pivotally connected to said cultivator and positioned in line with the shovels of the forward row of cultivator elements, a lever pivotally connected to said cultivator for vertical movement with respect thereto and connected to said damming shovels, cam mechanism supporting said lever, and means for rotating said cam to elevate and lower said lever and said damming shovels.

2. The structure in claim 1, and means for raising said damming shovels and maintaining them out of contact with the ground.

3. In a wheel supported cultivator, a plurality of rows of cultivator elements disposed transversely of the device, the cultivator elements of one row being staggered with respect to the cultivator elements of another row, a damming attachment comprising, a plurality of damming shovels assembled for movement as a unit, said assembly being pivotally secured to said cultivator, the shovels of said damming assembly lying along lines between the rear cultivator elements, and a vertical reciprocating drive connection between one of said wheels and said damming shovel assembly for alternately raising and lowering said damming elements with respect to the ground.

4. In a wheel supported cultivator, a row of cultivator elements disposed across the cultivator, a damming attachment comprising an assembly of damming shovels pivotally secured to said cultivator, the shovels of said damming assembly lying along lines between the cultivator elements, and vertically oscillating drive means connected to said damming shovel assembly for alternately raising and lowering said damming elements with respect to the ground.

5. In a cultivator or the like, a plurality of cultivating elements for forming alternate rows of ridges and furrows, a plurality of damming shovels lying along lines between the cultivator elements, and means for periodically raising and lowering said damming shovels, whereby said shovels will at spaced points split the ridges formed by said cultivator elements to dam adjacent portions of the furrows.

JOHN E. ERICKSON.